(12) United States Patent
Shen et al.

(10) Patent No.: US 8,414,197 B2
(45) Date of Patent: Apr. 9, 2013

(54) OPTICAL FIBER CONNECTOR WITH SHUTTER

(75) Inventors: Po-Hsun Shen, Taipei Hsien (TW); Bing Su, Shenzhen (CN); Shao-You Han, Shenzhen (CN); Xiao-Bo Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 254 days.

(21) Appl. No.: 12/979,355

(22) Filed: Dec. 28, 2010

(65) Prior Publication Data

US 2011/0268394 A1 Nov. 3, 2011

(30) Foreign Application Priority Data

Apr. 28, 2010 (CN) .......................... 2010 1 0158782

(51) Int. Cl.
*G02B 6/38* (2006.01)
(52) U.S. Cl. ............................................ 385/73; 385/58
(58) Field of Classification Search ................. 385/58, 385/73
See application file for complete search history.

(56) References Cited

U.S. PATENT DOCUMENTS

2006/0153503 A1* 7/2006 Suzuki et al. .................. 385/53

* cited by examiner

*Primary Examiner* — Jerry Rahll
(74) *Attorney, Agent, or Firm* — Altis Law Group, Inc.

(57) ABSTRACT

An optical fiber connector includes a plug having a ferrule, a housing sleeved on the plug, a frame slidably positioned on the housing, and a shutter rotatably mounted on the frame. The shutter includes a covering portion for covering the ferrule and a rotating portion formed on the covering portion. The housing forms a urging portion adjacent to the ferrule implementing the rotating portion and rotating the covering portion to cover the ferrule when the frame slides on the housing to a predetermined position.

15 Claims, 6 Drawing Sheets

OPTICAL FIBER CONNECTOR WITH SHUTTER

BACKGROUND

1. Technical Field

The present disclosure relates generally to optical fiber connectors, and especially to an optical fiber connector with a shutter.

2. Description of Related Art

A commonly used optical fiber connector includes a plug and a shutter rotatably mounted on the plug for covering the plug when the optical fiber connector is not used. An elastic mechanism including a spring is generally employed for mounting the shutter on the plug, so that the shutter may be closed, covering the plug automatically. However, elasticity of the spring can deteriorate with use.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
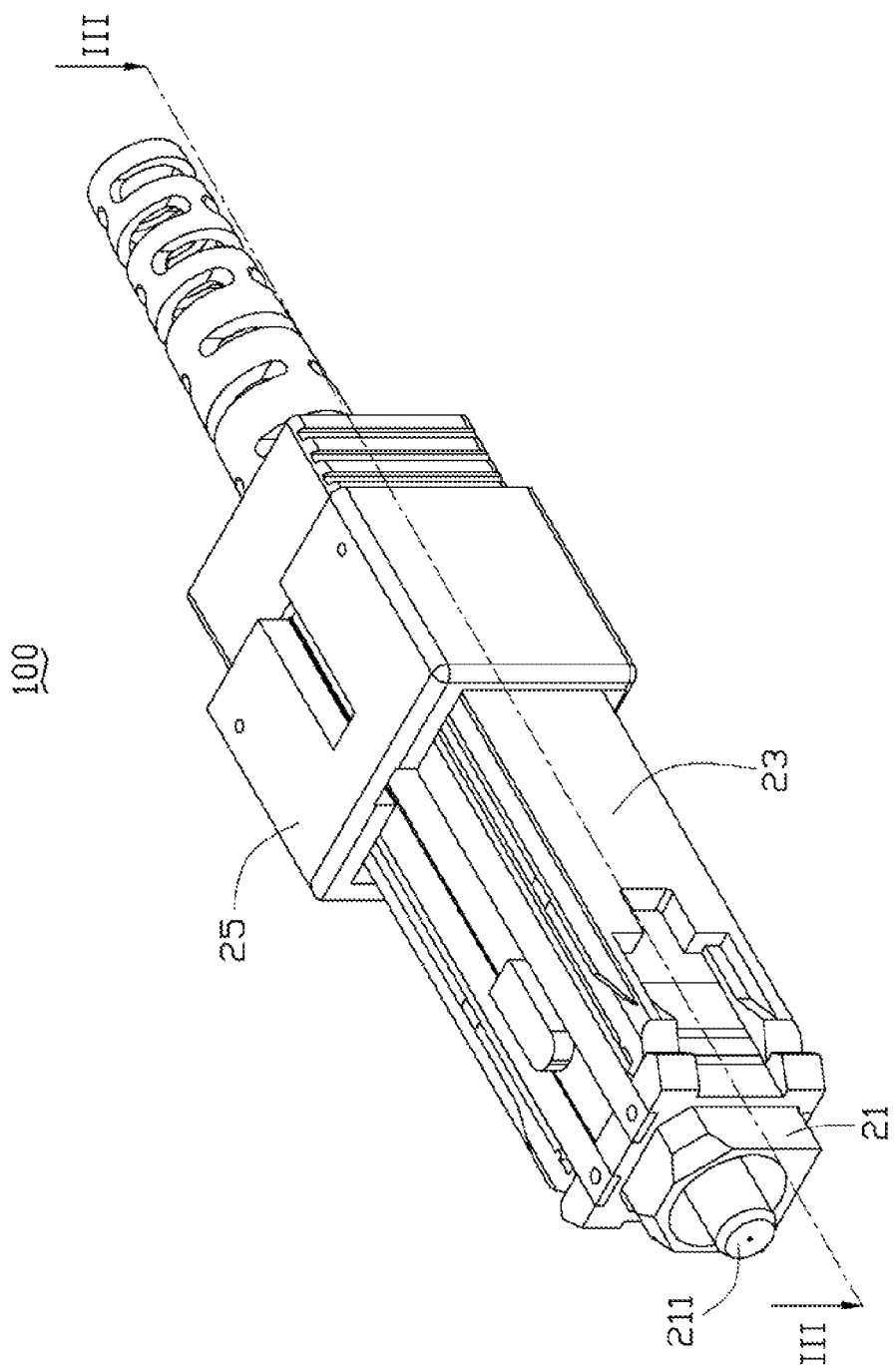
FIG. 1 is an isometric view of a first embodiment of an optical fiber connector in a first state.
Figure 2:
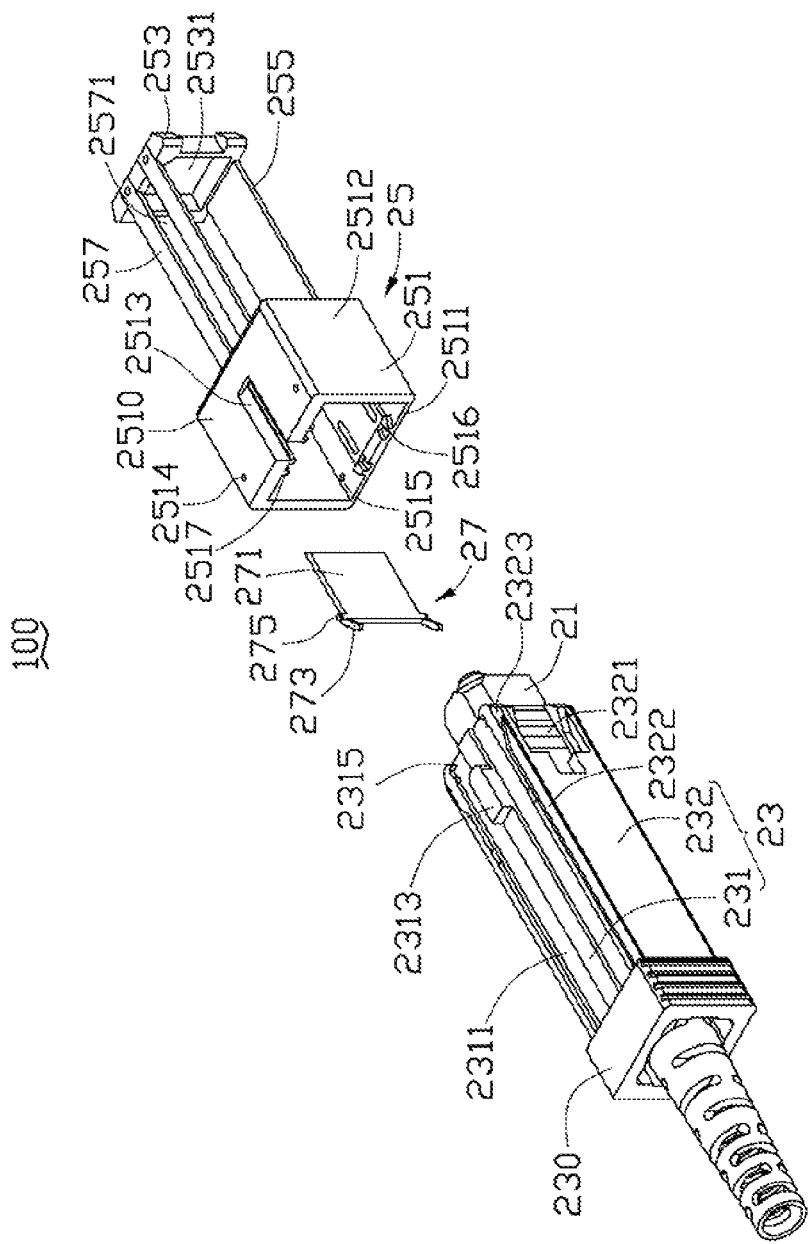
FIG. 2 is an exploded, isometric view of the optical fiber connector of FIG. 1.
Figure 3:
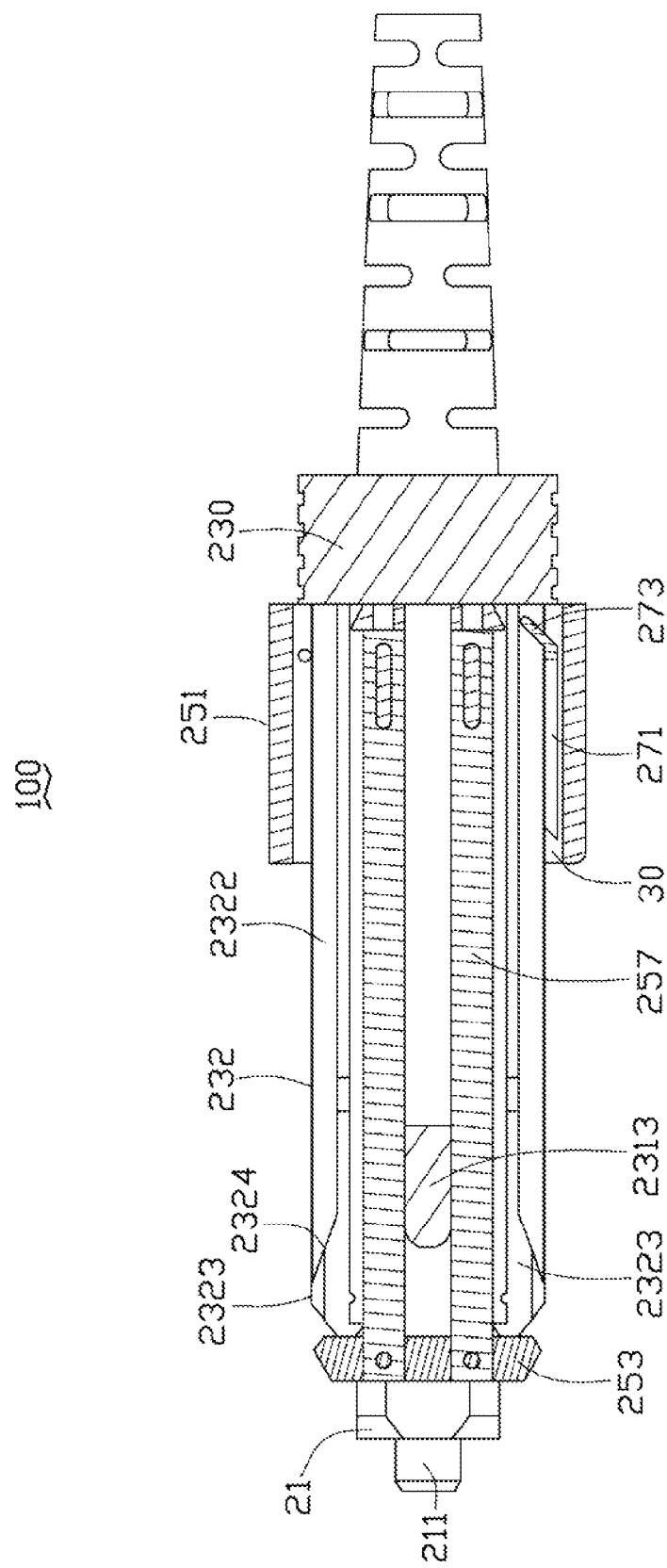
FIG. 3 is a cross section of the optical fiber connector of FIG. 1, taken along the line III-III.

Referring to FIGS. 1 through 3, an embodiment of an optical fiber connector 100 includes a plug 21, a housing 23 mounted on the plug 21, a frame 25, and a shutter 27. The plug 21 includes a ceramic ferrule 211 for receiving an optical fiber (not shown).

The housing 23 is substantially rectangular, and includes an operating portion 230 on an outer surface thereof. The housing 23 includes two first sidewalls 231 opposite to each other and two second sidewalls 232 opposite to each other. One of the first sidewalls 231 defines two substantially parallel sliding grooves 2311 and forms a guide strip 2313 between the two sliding grooves 2311, and the other first sidewall 231 defines a receiving groove (not shown). The housing 23 forms a pair of hooks 2315 at the first sidewall 231. Each hook 2315 is at an end of each sliding groove 2311 adjacent to the ferrule 211 on the sidewall 231. The housing 23 defines a latching groove 2321 on the second sidewall 232 adjacent to the ferrule 211 and two slits 2322 at two sides of the latching groove 2321 respectively. The housing 23 forms a urging portion 2323 at an end of each slit 2322. Each urging portion 2323 forms an angled contact surface 2324 adjacent to the slit 2322 for rotating the shutter 27.

The frame 25 includes a main body 251, a fixing member 253, a connecting member 255, and two slide rails 257. In the illustrated embodiment, the main body 251 is a rectangular barrel, and includes a top surface 2510, a bottom surface 2511, and two connecting walls 2512 interconnecting the top surface 2510 and the bottom surface 2511. The main body 251 defines a sliding slot 2513 at the top surface 2510, and two shaft holes 2514 at two sides of the sliding slot 2513 respectively. The main body 251 defines shaft holes 2515 corresponding to the shaft holes 2514 of the top surface 2510 for mounting the shutter 27. The fixing member 253 is a rectangular closure, defining a rectangular through hole 2531 at a center thereof. The two slide rails 257 are arranged at two sides of the sliding slot 2513 respectively. The main body 251 is capable of elastically opening, allowing the housing 23 to pass therethrough. An end of each slide rail 257 is fixed on an inner surface of the main body 251, the other end of each slide rail 257 is fixed on the fixing member 253. The connecting member 255 interconnects the main body 251 and the fixing member 253. Each slide rail 257 forms a stopping protrusion 2517 at an end adjacent to the main body 251.

The shutter 27 includes a covering portion 271, two rotating portions 273, and two shafts 275. The covering portion 271 is a substantially rectangular plate. The rotating portion 273 is a rod extending from the covering portion 273, and the rotating portion 273 is angled relative to the covering portion 271. Each shaft 275 extends from a side surface of the covering portion 271, and is substantially coplanar with the covering portion 271. In the illustrated embodiment, an angle θ defined by the rotating portion 273 is an obtuse angle, such as about 135°.

In assembly, the two shafts 275 of the shutter 27 are mounted in a shaft hole 2514 and the shaft hole 2515 of the main body 251 respectively, whereby the shutter 27 is rotatable in the main body 251 adjacent to the connecting wall 2512. When the covering portion 271 contacts the inner surface of the main body 251, the rotating portion 273 extends away from the inner surface of the main body 251. The main body 251 is elastically opened to be sleeved on the housing 23. The guide strip 2313 is received in the sliding groove 2513 and slides along the guide groove 2513 into the guide hole 2571, until the main body 251 abuts the operating portion 230. The fixing member 253 is sleeved on the plug 21, and the plug 21 partially extends out of the fixing member 253 and received in a receptacle (not shown). A gap 30 is defined between the connecting wall 2512 and the second sidewall 232 for receiving the covering portion 271 of the shutter 27. When the covering portion 271 of the shutter 27 is received in the gap 30, the rotating portion 273 is received in the slit 2322 of the housing 23. Each slide rail 257 is slidably positioned in a sliding groove 2311 of the housing 23. The guide strip 2313 is positioned between the two slide rails 257, for guiding the slide rail 257 in the sliding groove 2311.

Figure 4:
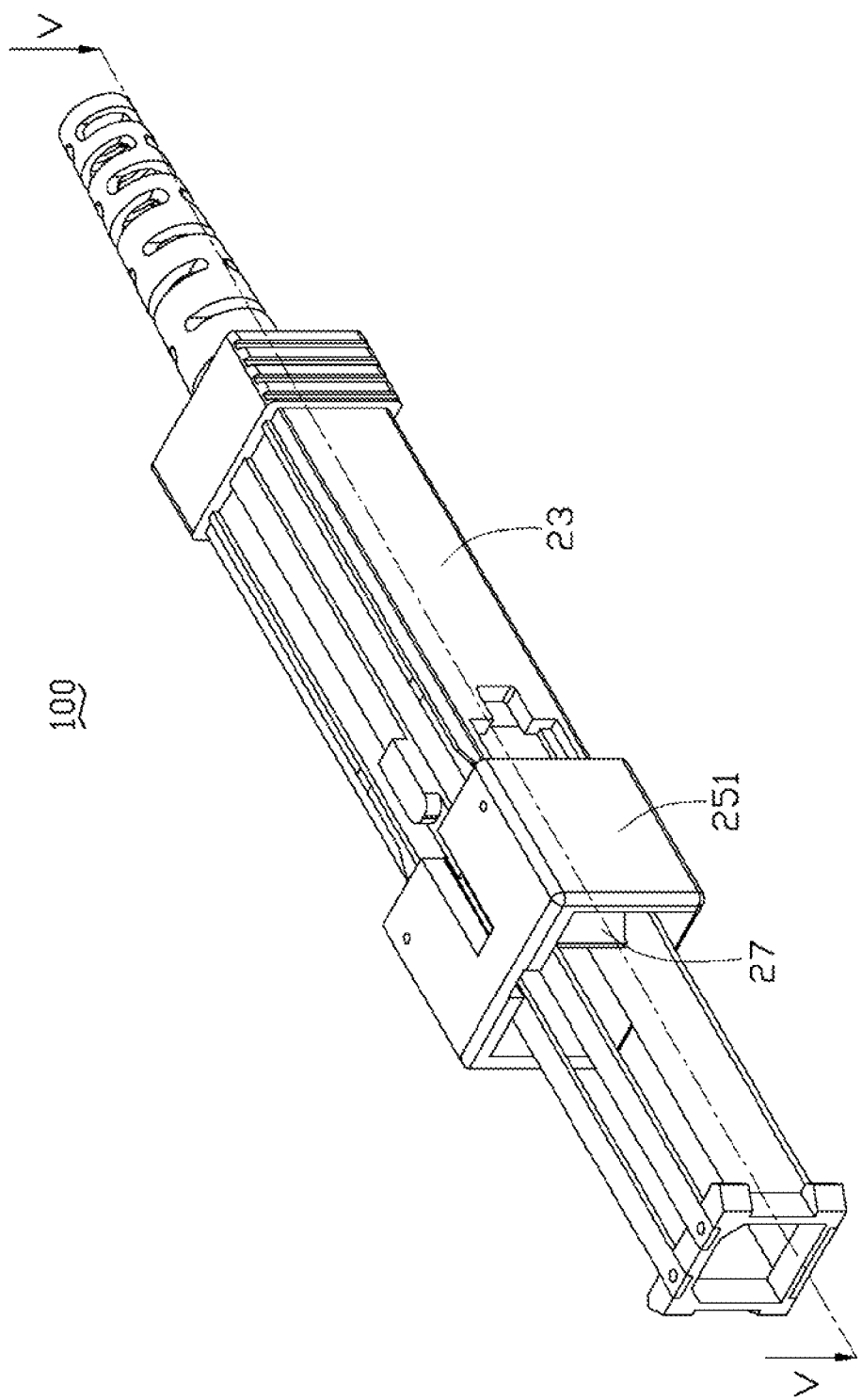
FIG. 4 is an isometric view of the first embodiment of an optical fiber connector, in a second state.
Figure 5:
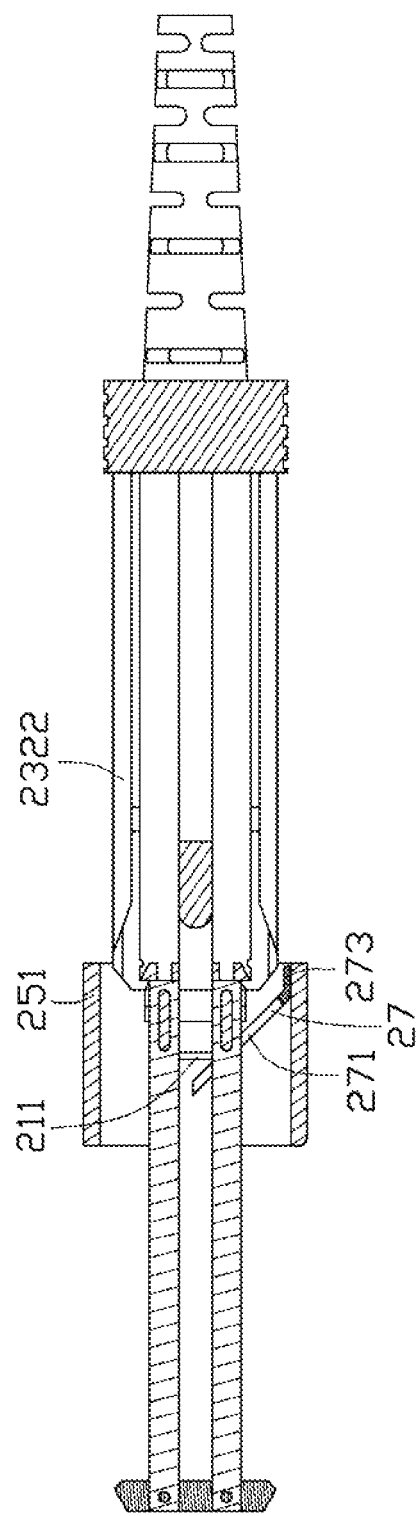
FIG. 5 is a cross section of the optical fiber connector of FIG. 4, taken along the line V-V.

Also referring the FIGS. 4 and 5, the main body 251 can be slid towards the ferrule 211 to a predetermined position adjacent to the ferrule 211 where the covering portion 273 extends out of the housing 23. The contact surface 2324 of the urging portion 2323 contacts the rotating portion 273, and turns the rotating portion 273 steadily to the ferrule 211, thus the covering portion 273 can cover the ferrule 211 to prevent contamination. Light from the plug 21 is blocked by the covering portion 271. The stopping protrusions 2516 of the main body 251 latch with the hooks 2315 of the housing 23, thus preventing the frame 25 from detaching from the housing 23. When the optical fiber connector 100 is to be received in a receptacle, the user can slide the main body 251 away from the ferrule 211 until the main body 251 is blocked by the operating portion 230. The ferrule 211 is exposed out of the fixing member 253 and can be inserted into the receptacle.

The angle θ may be adjusted, thus the covering portion 271 may cover the ferrule 211 partially or totally. When the angle θ is 90°, the ferrule 211 can be totally covered by the covering portion 271, and the shaft holes 2514, 2515 and urging portion 2323 are adjusted accordingly.

It is should be noted that the stopping protrusions 2516, 2517 may be formed or mounted on the first sidewall 231, and the shutter 27 is rotatably positioned on the top surface 2510 or the bottom surface 2511.

Figure 6:
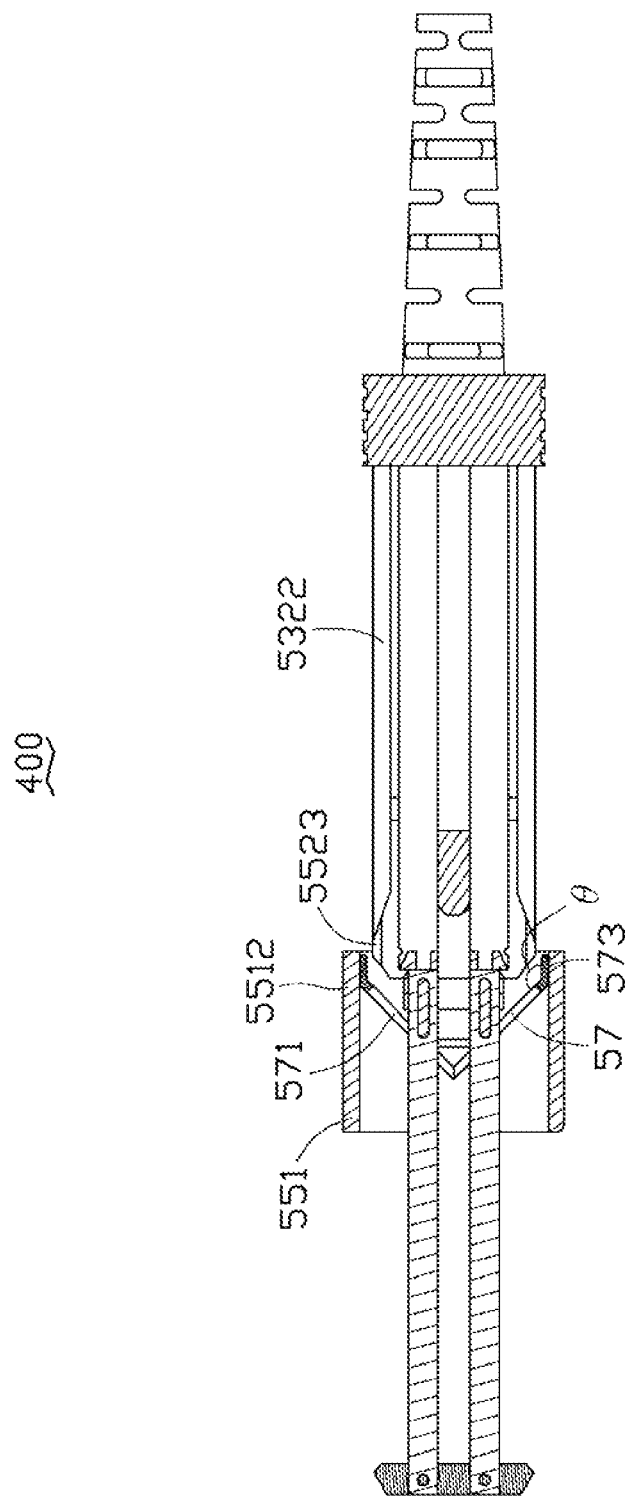
FIG. 6 is a cross section of a second embodiment of the optical fiber connector.

FIG. 6 shows a second embodiment of an optical fiber connector 400, differing from the first embodiment of optical fiber connector 100 only in that the optical fiber connector 400 includes a pair of shutters 57 mounted on opposite connecting walls 5512 respectively. The two shutters 57 cooperatively cover the ferrule 511 when the optical fiber connector 400 is not in use.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An optical fiber connector comprising:
    a plug having a ferrule;
    a housing sleeved on the plug;
    a frame slidably positioned on the housing; and
    a shutter rotatably mounted on the frame, wherein the shutter comprises a covering portion for covering the ferrule and a rotating portion formed on the covering portion; the housing forms a urging portion adjacent to the ferrule capable of urging the rotating portion and turning the covering portion to cover the ferrule when the frame slides on the housing to a predetermined position, the housing further comprises a first sidewall and a second sidewall connected to the first sidewall, the housing defines a slit on the second sidewall for receiving the rotating portion, and an end of the slit is adjacent to the urging portion.

2. The optical fiber connector of claim 1, wherein an angle defined by the covering portion and the rotating portion is about 90°.

3. The optical fiber connector of claim 1, wherein the urging portion forms an angled contact surface at a side surface of the urging portion adjacent to the slit for urging the rotating portion.

4. The optical fiber connector of claim 1, wherein the housing defines two sliding grooves at the first sidewall, and the frame comprises two slide rails slidably positioned in the two sliding grooves respectively.

5. The optical fiber connector of claim 4, wherein the two slide rails define a guide groove therebetween, and the housing forms a guide strip received in the guide groove.

6. The optical fiber connector of claim 4, wherein the housing forms a hook at an end of the sliding groove adjacent to the ferrule, the frame forms a stopping protrusion corresponding to the hook to prevent the frame from detaching from the housing when sliding on the housing.

7. The optical fiber connector of claim 4, wherein the frame further comprises a fixing member and a main body, the two slide rails interconnect the fixing member and the main body, and the fixing member defines a through hole for the ferrule passing through.

8. An optical fiber connector comprising:
    a plug having a ferrule;
    a housing sleeved on the plug;
    a frame slidably positioned on the housing; and
    a pair of shutters rotatably mounted on the frame, wherein each shutter comprises a covering portion for covering the ferrule and a rotating portion formed on the covering portion;
    the housing forms a urging portion adjacent to the ferrule capable of urging the rotating portion and turning the covering portion, such that the pair of shutters cover the ferrule cooperatively when the frame slide on the housing to a predetermined position.

9. The optical fiber connector of claim 8, wherein an angle defined by the covering portion and the rotating portion is about 90°.

10. The optical fiber connector of claim 8, wherein the housing comprises a first sidewall and a second sidewall connected to the first sidewall, the housing defines a slit on the second sidewall for receiving the rotating portion, and an end of the slit is adjacent to the urging portion.

11. The optical fiber connector of claim 10, wherein the urging portion forms an angled contact surface at a side surface of the urging portion adjacent to the slit for urging the rotating portion.

12. The optical fiber connector of claim 11, wherein the housing defines two sliding grooves at the first sidewall, and the frame comprises two slide rails slidably positioned in the two sliding grooves respectively.

13. The optical fiber connector of claim 12, wherein the two slide rails define a guide groove therebetween, and the housing forms a guide strip received in the guide groove.

14. The optical fiber connector of claim 12, wherein the housing forms a hook at an end of the sliding groove adjacent to the ferrule, and the frame forms a stopping protrusion corresponding to the hook to prevent the frame from detaching from the housing when sliding on the housing.

15. The optical fiber connector of claim 12, wherein the frame further comprises a fixing member and a main body, the two slide rails interconnect the fixing member and the main body, and the fixing member defines a through hole for the ferrule passing through.

* * * * *